(12) United States Patent
Horvath et al.

(10) Patent No.: US 11,698,138 B1
(45) Date of Patent: Jul. 11, 2023

(54) GATE VALVE WITH ANGLED BODY

(71) Applicant: ZP INTERESTS, LLC, Spring, TX (US)

(72) Inventors: Balazs Horvath, Veszprem (HU); Charles W. Bedford, Hempstead, TX (US)

(73) Assignee: ZP INTERESTS, LLC, Spring, TX (US)

( * ) Notice: Subject to any disclaimer, the term of this patent is extended or adjusted under 35 U.S.C. 154(b) by 0 days.

(21) Appl. No.: 17/338,893

(22) Filed: Jun. 4, 2021

Related U.S. Application Data

(60) Provisional application No. 63/036,556, filed on Jun. 9, 2020.

(51) Int. Cl.
| | |
|---|---|
| *F16K 3/314* | (2006.01) |
| *F16K 3/36* | (2006.01) |
| *F16K 3/02* | (2006.01) |
| *F16K 27/12* | (2006.01) |
| *F16K 27/04* | (2006.01) |

(52) U.S. Cl.
CPC ............ *F16K 3/314* (2013.01); *F16K 3/0209* (2013.01); *F16K 3/36* (2013.01); *F16K 27/044* (2013.01); *F16K 27/12* (2013.01)

(58) Field of Classification Search
CPC .......... F16K 3/314; F16K 3/0209; F16K 3/36; F16K 27/12; F16K 27/044
USPC ................................................. 251/326–329
See application file for complete search history.

(56) References Cited

U.S. PATENT DOCUMENTS

| | | | | |
|---|---|---|---|---|
| 1,780,828 A | * | 11/1930 | Leach ....................... | F16K 3/36 303/56 |
| 2,002,965 A | * | 5/1935 | Smith ..................... | F16K 25/04 251/327 |
| 2,011,087 A | * | 8/1935 | Sherman .................. | F16K 3/36 251/266 |
| 2,348,642 A | * | 5/1944 | Penick ..................... | F16K 3/36 137/240 |
| 2,433,638 A | * | 12/1947 | Volpin ..................... | F16K 3/36 251/366 |
| 2,570,413 A | * | 10/1951 | Volpin ..................... | F16K 3/36 251/366 |
| 2,605,078 A | * | 7/1952 | Volpin ..................... | F16K 3/36 137/246.11 |
| 2,626,775 A | * | 1/1953 | Lange ................... | F16K 27/047 137/315.31 |
| 2,869,574 A | * | 1/1959 | Volpin ..................... | F16K 3/36 251/327 |
| 2,923,310 A | * | 2/1960 | Eckert, Jr. ................. | F16K 3/36 137/246.13 |
| 3,026,895 A | * | 3/1962 | Volpin ..................... | F16K 3/36 137/246.12 |

(Continued)

*Primary Examiner* — John Bastianelli
(74) *Attorney, Agent, or Firm* — Shackelford, Bowen, McKinley & Norton, LLP; David L. Odom

(57) ABSTRACT

An exemplary gate valve includes a valve body having a gate cavity intersecting a through bore, the gate cavity extending through a first end of the valve body, an inner surface forming the gate cavity is angled outward from a center axis of the gate cavity to a gate cavity opening at the first end, and a gate positioned in the gate cavity and moveable between a closed position blocking flow through the through bore and an open position allowing flow through the through bore, the gate having a sealing face extending perpendicular to the through bore.

11 Claims, 8 Drawing Sheets

(56) References Cited

U.S. PATENT DOCUMENTS

| | | | | |
|---|---|---|---|---|
| 3,349,789 A * | 10/1967 | Crain | ............... | F16K 3/186 |
| | | | | 137/246.22 |
| 3,463,446 A * | 8/1969 | Natho | ............... | F16K 31/60 |
| | | | | 251/266 |
| 4,136,710 A * | 1/1979 | Bond | ............... | F16L 55/10 |
| | | | | 137/246.22 |
| 4,471,943 A * | 9/1984 | Nelson | ............... | F16K 3/02 |
| | | | | 251/327 |
| 4,741,509 A * | 5/1988 | Bunch | ............... | F16K 3/0236 |
| | | | | 251/327 |
| 5,341,835 A * | 8/1994 | Lanning, II | ............... | F16K 3/0227 |
| | | | | 137/246.22 |
| 5,415,378 A * | 5/1995 | Craven | ............... | E21B 34/02 |
| | | | | 251/329 |
| 9,091,351 B2 * | 7/2015 | DeOcampo | ............... | F16K 37/0041 |
| 2017/0102078 A1 * | 4/2017 | DeOcampo | ............... | F16K 37/0041 |
| 2019/0032793 A1 * | 1/2019 | Lah | ............... | F16K 3/0236 |

\* cited by examiner

GATE VALVE WITH ANGLED BODY

CROSS-REFERENCE TO RELATED APPLICATIONS

This application claims the benefit of and priority from U.S. Provisional Patent Application No. 63/036,556, entitled GATE VALVE WITH ANGLED BODY, filed Jun. 9, 2020, the disclosure and entire contents of which are incorporated by reference in their entirety herein for all purposes.

TECHNICAL FIELD

This disclosure relates in general to the field of gate valves, and more particularly, but not by way of limitation, to gate valves with an angled body.

BACKGROUND

This section provides background information to facilitate a better understanding of the various aspects of the disclosure. It should be understood that the statements in this section of this document are to be read in this light, and not as admissions of prior art.

Industrial piping relies upon many types of valves, but by far the most prevalent are gate valves, which are used in applications where it is desired to prevent or allow flow of fluid through piping. Gate valves are particularly useful when minimal flow restriction is desired. Gate valves operate by having a planar member, the gate, which moves in a cavity within the valve. The gate can be translated within the gate valve so that an opening in the gate is in alignment with the flow passageway of the gate valve, an open position in which the gate valve allows fluid to flow through it from one side to the other. However, if the gate is translated to a position so that the opening within the gate is sufficiently out of alignment and unregistered with the flow passageway, a closed position, the flow through the gate is blocked such that fluid does not pass from one side of the gate valve to the other.

Often gate valves carry fluids that contain suspended solids. These fine solid particles can clog the gate passageway. In typical gate valves, solid particles in slurries that pass though the valve passageway tend to escape from the flow passageway into the gate cavity where they can concentrate. In the cavities, these solids can pack and in some cases solidify. These solid particles can compress in the ends of the gate passageway such that the amount of particulate matter at the ends prevent the gate from travelling freely in the gate passageway from a completely open to a completely closed position. When this happens, the gate valve may either provide excessive restriction of fluid flow in the open position on be unable to prevent flow in the closed position.

SUMMARY

An exemplary gate valve includes a valve body having a gate cavity intersecting a through bore, the gate cavity extending through a first end of the valve body, an inner surface forming the gate cavity is angled outward from a center axis of the gate cavity to a gate cavity opening at the first end, and a gate positioned in the gate cavity and moveable between a closed position blocking flow through the through bore and an open position allowing flow through the through bore, the gate having a sealing face extending perpendicular to the through bore.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
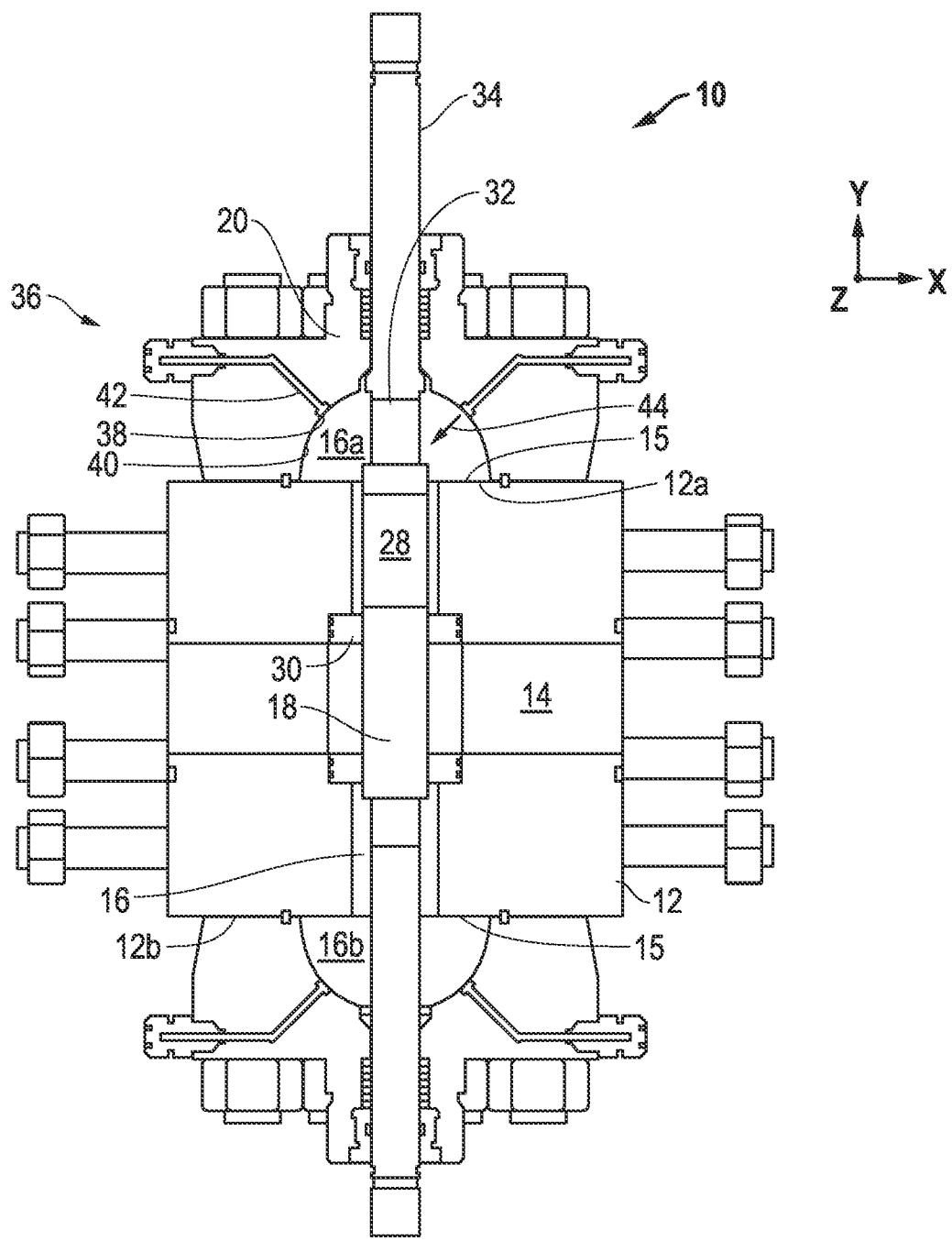
FIG. 1 is a schematic view of a gate valve according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIGS. 1-13 illustrate various aspects of exemplary gate valves. FIG. 1 illustrates a cut-away view of an exemplary gate valve 10 illustrating aspects of the disclosure. Valve 10 has a valve body 12 with a through bore 14 through which fluid flows when the valve is in the open position. Valve body 12 forms a gate cavity 16 extending perpendicular to through bore 14 and in which gate 18 translates. Gate cavity 16 terminates at ends 16a, 16b located in bonnets 20 in the illustrated valve. As will be understood by those skilled in the art with benefit of this disclosure, valve 10 may only have a single bonnet. Gate cavity 16 is open at opposing ends 12a and 12b of valve body 12. Terminal gate cavity ends 16a and 16b are formed by bonnets 20 and, as is common in gate valves, the terminal gate cavity ends are larger than the gate cavity 16 formed in the valve body. Thus, the end of the valve body may form a shoulder 15 at the gate cavity transition between the body and the bonnet. This shoulder may create a location at which debris and old grease accumulates. This gate cavity transition may be addressed m some embodiments as described for example with reference to FIGS. 9 and 10 below.

Figure 2:
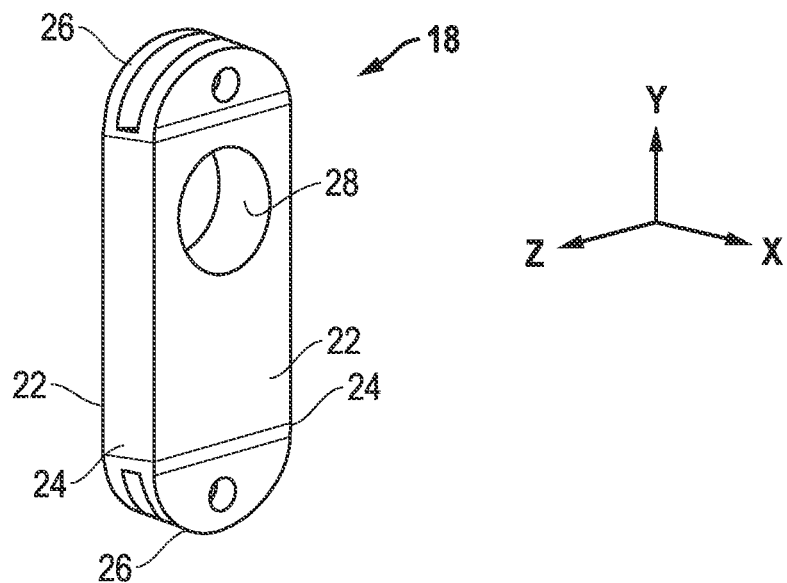
FIG. 2 illustrates an exemplary gate according to one or more aspects of the disclosure.
Figure 3:
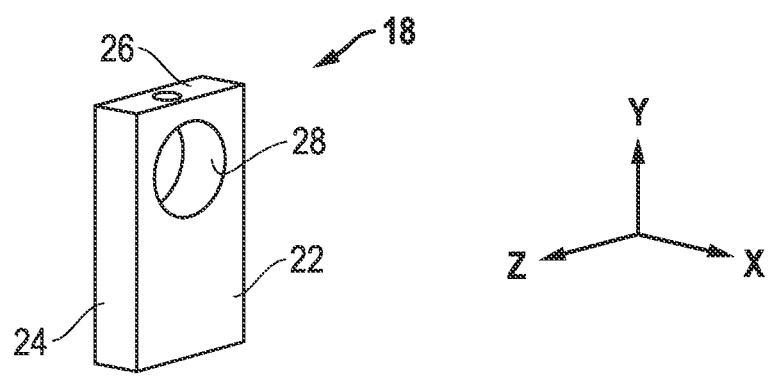
FIG. 3 illustrates another exemplary gate according to one or more aspects of the disclosure.

Gate 18 as illustrated for example in FIGS. 2 and 3 is a generally rectangular member having opposing planar sealing faces 22, opposing sides 24, and opposing ends 26. A gate bore 28 extends through gate 18 across the opposing sealing faces 22. Seat seals 30 are positioned adjacent through bore 14 on opposite sides of gate cavity 16 to seal with sealing faces 22. A stem 32 is connected at end 26 of the gate and to an actuator 34 to translate gate 18 in gate cavity 16.

FIGS. 1-6 depict three mutually orthogonal directions X, Y, and Z forming a three-dimensional frame of reference XYZ. Longitudinal axis X corresponds to the center axis of valve through bore 14. Transverse axis Z is perpendicular to longitudinal axis X and is generally centered through gate side 24 and extends parallel to gate sealing faces 22. The X-Z plane is considered to be "horizontal" with reference to the orientation of valve 10 in FIG. 1. The Y axis corresponds to the center axis of gate cavity 16 and is oriented perpendicularly with respect to the X-Z plane. The Y-X plane and Y-Z plane are considered to be "vertical" for purposes of description.

Gate valve 10 includes one or more grease ports 36 each of which is oriented toward a sealing face 22 of gate 16. Grease port 36 may include an opening 38 formed at the inner surface 40 of gate cavity 16 and a channel 42 formed in valve 10 (body 12 and or bonnet 20) and in communication with the opening. In some examples opening 38 directs lubricant 44 at sealing face 22. In some examples, channel 42 and opening 38 cooperate to direct lubricant 44 at sealing face 22. Prior grease ports are oriented parallel to sealing face 22.

The orientation of grease port 36 is now described with reference, in particular, to FIGS. 4-5. The orientation of grease port 36 corresponds to the direction that lubricant 44 is discharged from grease port 36. Grease port 36 is directed toward gate sealing face (surface) 22. Directing the lubricant toward the gate sealing face makes the sealing surface the priority when greasing the valve, may reduce greasing time, reduce the volume of grease required, and increase effectiveness of the flush.

Figure 4:
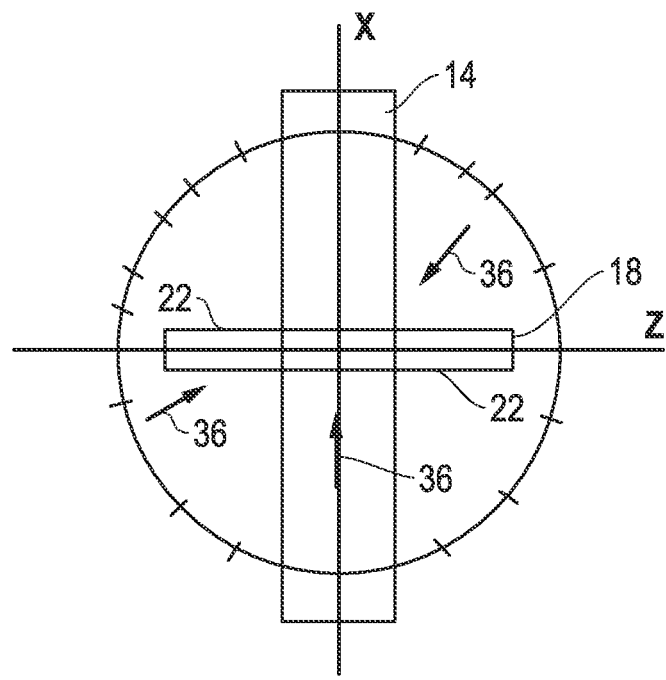
FIG. 4 is a view along a center axis of a gate cavity illustrating exemplary grease port orientations.
Figure 5:
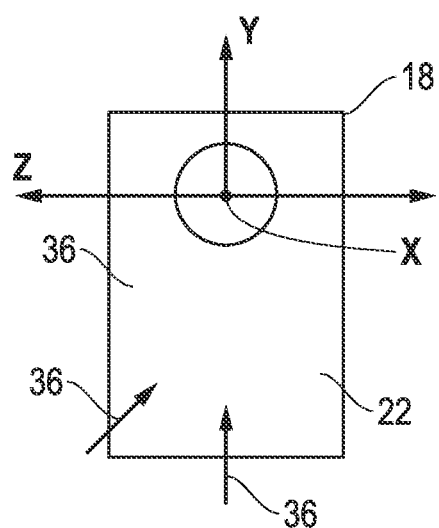
FIG. 5 is view of a gate along a center axis of valve through bore illustrating exemplary grease port orientations.
Figure 6:
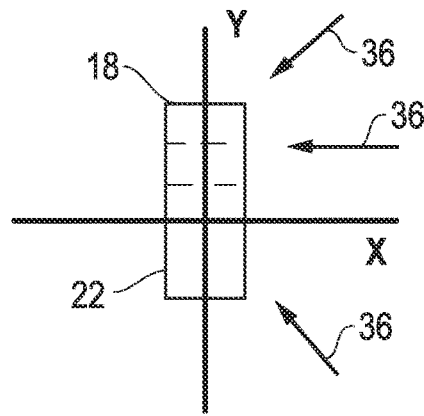
FIG. 6 is view of a gate along a transverse axis illustrating exemplary grease port orientations.

FIG. 4 is a schematic view along the Y axis extending along the center of the gate cavity. FIG. 5 is a schematic view along the X axis extending along the center line of the valve through bore and perpendicular to gate sealing face 22 and FIG. 6 is a schematic view along the Z axis. The orientation of exemplary grease ports is shown by the arrows 36 indicating the direction that the lubricant is discharged. Grease ports 36 are oriented oblique to the Z axis, thus the lubricant is not discharged parallel to gate sealing face 22. In accordance to an embodiment, the angled grease ports are oriented in-line with valve through bore 14 and extend generally in the X-Y plane and may or may not be parallel to the X axis. In accordance to another embodiment angled grease port 36 is oriented oblique to the Y-Z plane and within a range of about +/−15 degrees of the X-axis relative to the X-Z plane. In accordance to another embodiment angled grease port 36 is oriented oblique to the Y-Z plane and within a range of about +/−30 degrees of the X-axis relative to the X-Z plane. In accordance to another embodiment angled grease port 36 is oriented oblique to the Y-Z plane and within a range of about +/−45 degrees of the X axis relative to the X-Z plane. In accordance to another embodiment angled grease port 36 is oriented oblique to the Y-Z plane and within a range of about +/−60 degrees of the X-axis relative to the X-Z plane. In accordance to another embodiment angled grease port 36 is oriented oblique to the Y-Z plane and within a range of about +/−75 degrees of the X axis relative to the X-Z plane. In accordance to another embodiment angled grease port 36 is oriented oblique to the Y-Z plane and within a range of about +/−88 degrees of the X axis relative to the X-Z plane.

Figure 7:
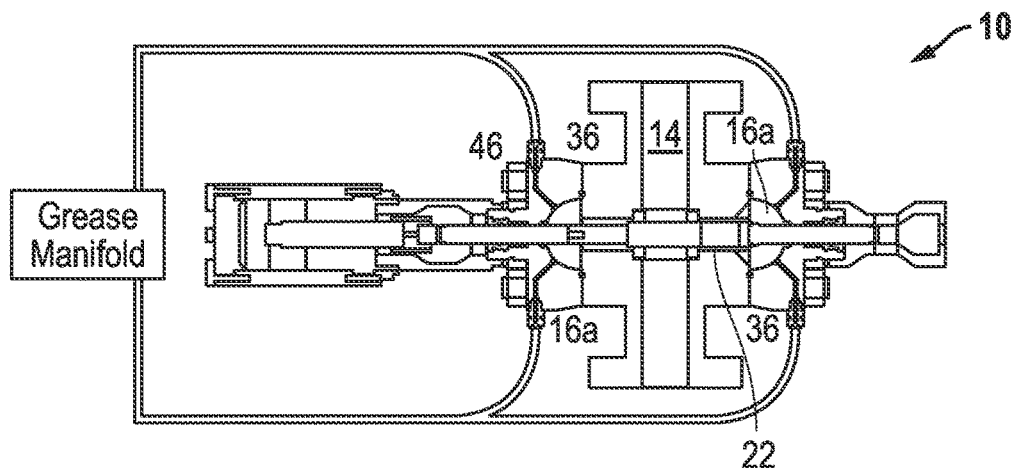
FIG. 7 illustrates a method of greasing a gate valve using angled grease ports according to one or more aspects of the disclosure.

An exemplary method 700 of lubricating a gate valve 10, in a half open or half closed position, utilizing one or more sand eliminator grease ports 36 is now described with reference to FIG. 7. Exemplary greases include silicon and castor oil based lubricant for low temperature, CO2 resistance, H2S resistance, and resistance to hydrocarbons. In this example, gate valve 10 includes four angled grease ports 36. Grease ports 36 are in communication with the gate cavity and oriented generally in-line with valve through bore 14 and oriented toward gate sealing face 22. A first pair of angled greases ports 36 are located at one end and in communication with gate cavity 16a and a second pair of angled grease ports 36 are located at the other end and in communication with gate cavity 16. The angled ports of each pair of angled ports are oriented toward opposite gate sealing faces 22. At block 702, if the valve is in service, it should be isolated from pressure. If the valve cannot be isolated, then lubricating pressure must exceed the pressure in the valve body. At block 704, operate the valve to half open position as illustrated in FIG. 7. At block 706, bleed pressure from the gate cavity. At block 708, connect grease hoses to angled grease ports 36 at autoclave fittings 46. At block 710, pump grease into the gate cavity and valve body. At block 712, operate the gate from the half open position to a normal operating position.

Figure 8:
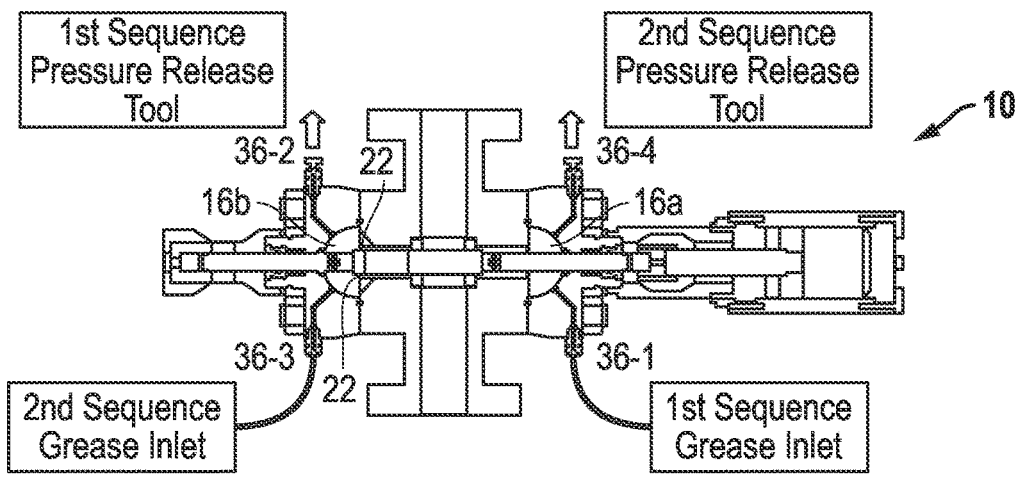
FIG. 8 illustrates another method of greasing a gate valve using angled grease ports according to one or more aspects of the disclosure.

An exemplary method 800 of lubricating a gate valve 10, in a fully open or fully closed position, utilizing one or more sand eliminator grease ports 36 is now described with reference to FIG. 8. In this example, gate valve 10 includes four angled grease ports 36. Grease ports 36 are in communication with the gate cavity and oriented generally in-line with valve through bore 14 and oriented toward gate sealing face 22. A first pair of angled greases ports 36 are located at one end and in communication with gate cavity 16a and a second pair of angled grease ports 36 are located at the other end and in communication with gate cavity 16. For the purpose of description, a first angled grease port 36-1 is located at a first end and directed at a first sealing face 22 and a second angled grease port 36-2 is located at a second end and directed at a second sealing face 22. A third angled grease port 36-3 is located at the second end and directed at the first sealing face 22 and the fourth angled grease port 36-4 is located at the first end and directed at the second sealing face 22. At block 802, if the valve is in service, it should be isolated from pressure. If the valve cannot be isolated, then lubricating pressure must exceed the pressure in the valve body. At block 804, operate the valve to a closed or open positon. At block 806, bleed pressure from the gate cavity. At block 808, connect grease unit to first angled grease port 36-1 and second angled grease port 36-3. At block 810, using a cross pattern pump grease into the valve body through first angled port 36-1 and releasing through second angled port 36-2 and into the valve body through third angled port 36-3 and releasing through fourth angled port 36-4. At block 812, continue pumping grease and operating the valve until the valve body is filled with grease or until clean grease exits through angled ports 36-2 and 36-4.

Figure 9:
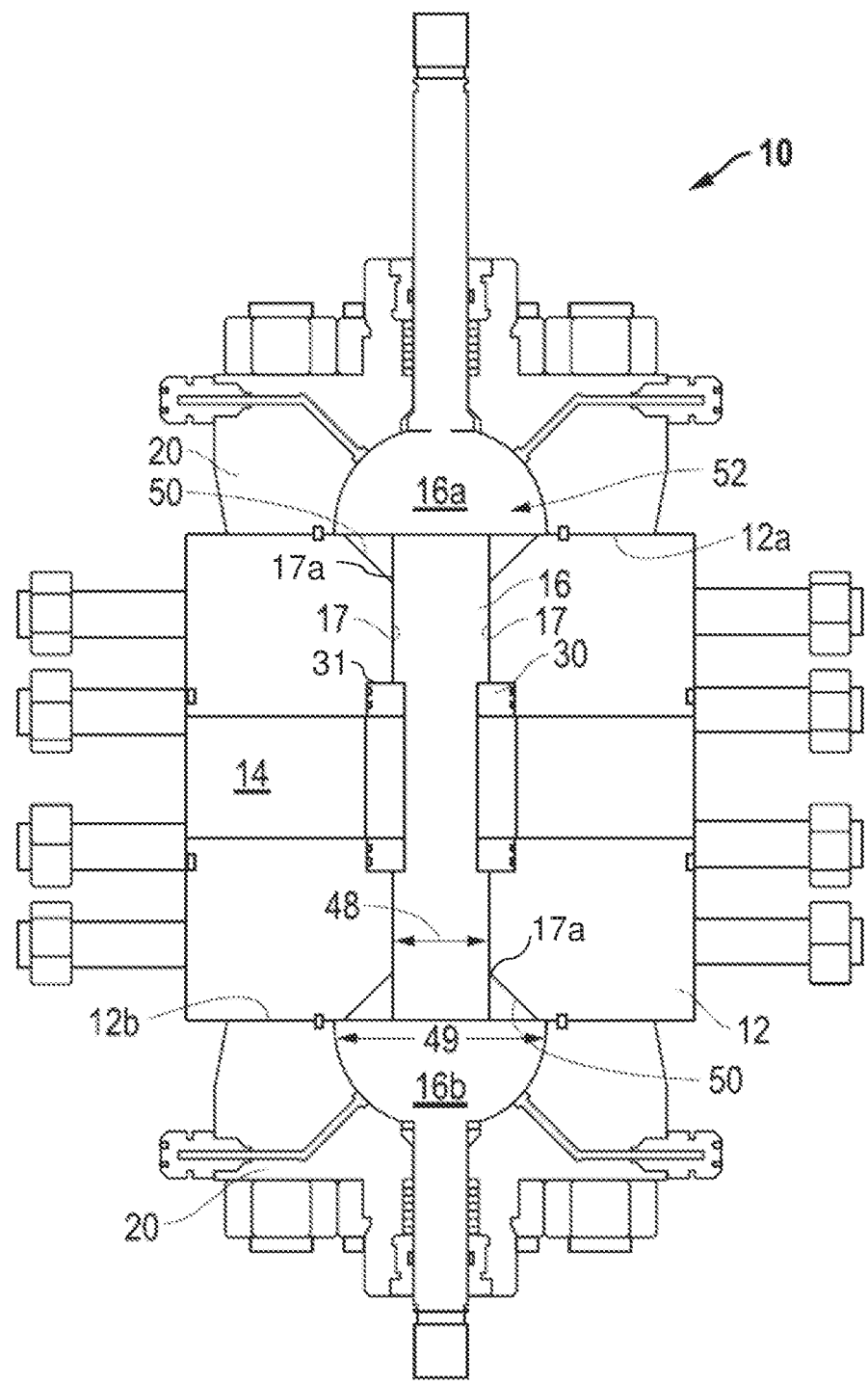
FIG. 9 illustrates an exemplary gate valve with a body angled at an end forming a widened opening into the gate cavity according to one or more aspects of the disclosure.
Figure 10:
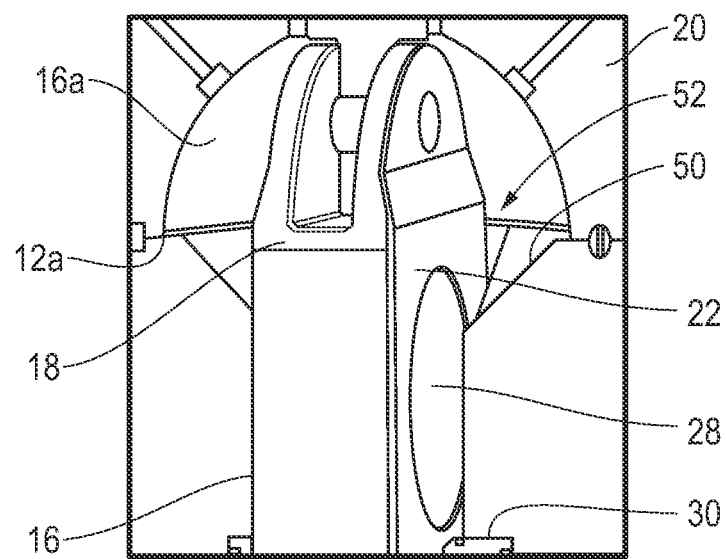
FIG. 10 illustrates an exemplary gate body angled at an end forming a widened opening into the gate cavity according to one or more aspects of the disclosure.

FIGS. 9 and 10 illustrate another exemplary gate valve 10 incorporating an angled valve body 12 at gate cavity 16. The gate is removed from FIG. 9 to more clearly show gate cavity 16. As will be understood by those skilled in the art with benefit of this disclosure, the angled valve body feature may be utilized with or without the angled grease ports described with reference to FIGS. 1-8. For example, the angled gate valve body may be used with a grease port oriented parallel to gate sealing face 22.

Gate cavity 16 extends perpendicular to body through bore 14. In this example, gate cavity extends from a first, or top, end 12a and a second, or bottom, end 12b. In some embodiments, gate cavity may be open only at one end of the valve body. Gate cavity 16 is generally rectangular in shape with opposing walls 17 extending parallel to one another and parallel to opposing gate sealing faces 22. Seat pockets 31 are formed in opposing walls 17 around through bore 14 in which seal seats 30 are positioned. Gate cavity 16 generally has a first width 48 between opposing walls 17 to fit the thickness of gate 18 extending between opposing sealing faces 22. Terminal gate cavity ends 16a, 16b have a larger opening 49 than first width 48. First width 48 extends from seat pockets 31 to a kickoff point 17a. In accordance with embodiments, the inner surface 50 of opposing walls 17 of valve body 12 at body ends 12a, 12b, forming terminal cavity openings 52 of gate cavity 16, is sloped or angled outward from kickoff point 17a to a respective body end 12a, 12b, changing the shape and increasing the size of gate cavity 16 at body ends 12a, 12b such that terminal gate cavity openings 52 is substantially equal to the diameter 49 of terminal gate cavity ends 16a, 16b formed by the bonnets 20 at least along the perimeter facing the sealing faces 22 of gate 18. In an exemplary embodiment, opposing walls 17 are angled outward at kickoff point 17a from center axis Y in the direction toward the terminal gate cavity ends 16a, 16b. With reference to FIG. 9, gate cavity 16 has a generally hour glass shape. The sloped inner surface 50 from kickoff points 17a to body ends 12a, 12b create a funnel shaped gate cavity opening 52 at body ends 12a, 12b. In an exemplary embodiment, inner surface 50 is sloped at an angle of about 45-degrees to the center axis.

Figure 13:
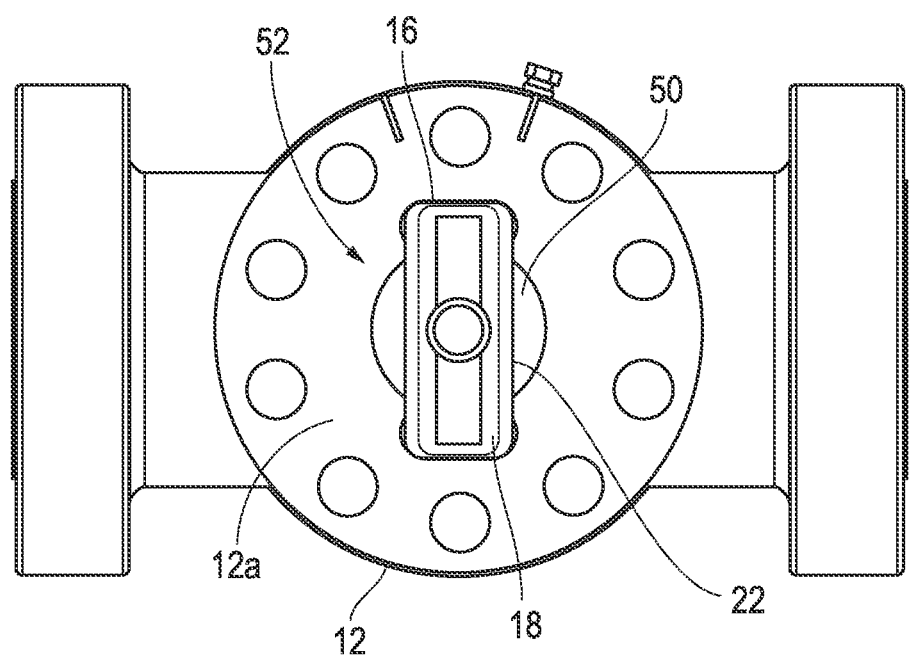
FIG. 13 is an exemplary plan view of a valve body illustrating an exemplary angled body opening into the gate cavity.

In operation, the sloped or funnel shaped gate cavity openings 52 eliminate, or reduce the size of, shoulder 15 shown in FIG. 1. Additionally, the funnel shaped gate cavity openings 52 allows injected grease to flow more effectively, flushing old grease and contaminates toward gate bore 28 to exit. During operation, going between open and close, the gate must displace packed grease and contaminates in the cavity toward the valve bore. The funnel shaped gate cavity opening 52 promotes effective flow of the grease and contaminants and directs flow of grease to the critical gate sealing surfaces 22. FIG. 13 illustrates inner surface 50 angled outward along the portion of opening 52 adjacent gate sealing surfaces 22 to funnel grease into gate cavity 16.

Figure 11:
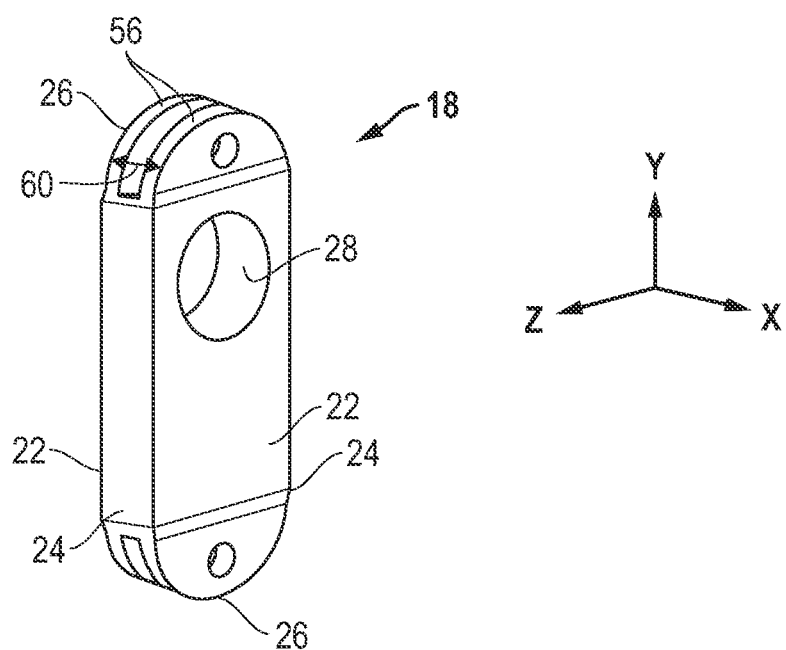
FIG. 11 illustrates an exemplary gate with a recessed feature according to one or more aspects of the disclosure.
Figure 12:
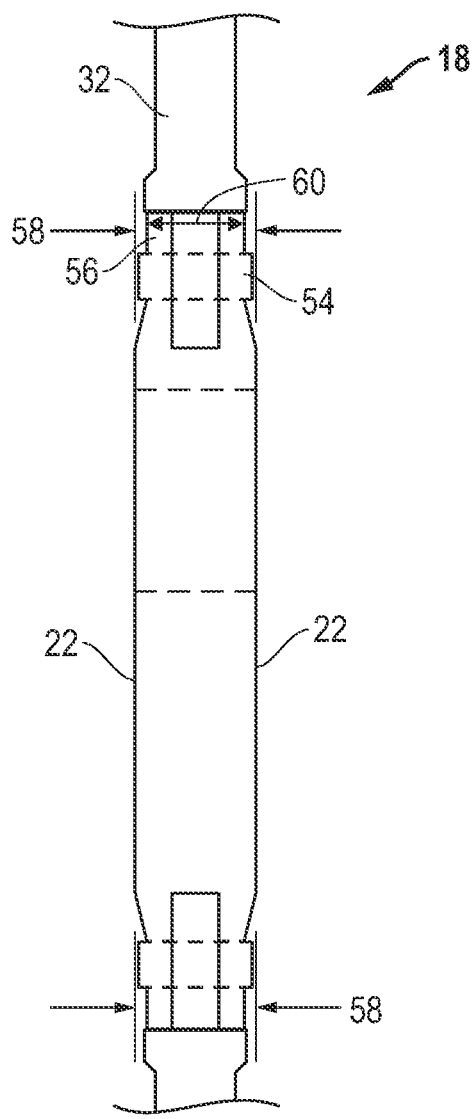
FIG. 12 illustrates a side view of the exemplary gate with a recessed feature of FIG. 11.

FIGS. 11 and 12 illustrate another exemplary gate 18 according to aspects of this disclosure. Gate 18 is a generally rectangular member having opposing planar sealing faces 22, opposing sides 24, and opposing ends 26. A gate bore 28 extends through gate 18 across the opposing sealing faces 22. One or both ends 26 are connected to a stem 32. Gate 18 has a width 58 extending between the opposing sealing faces 22. In this embodiment, one or both ends 26 have a width 60, measured in a direction perpendicular to the sealing faces that is less than width 58 at the sealing faces. The recessed profile of ends 26 may provide for more effective lubrication of the critical sealing face 22 area and aide flushing grease and contaminants from the gate cavity into the gate bore and valve through bore. Gate 18 with the recessed feature can be used in any gate valve configuration and may be utilized in combination with, or separate from, the angled grease port and/or the angled valve body illustrated in FIGS. 1-10. For example, a gate 18 with a recessed end feature can be implemented in an existing, convention gate valve. In some embodiments, a gate valve incorporates a gate 18 with a recessed end 26 in combination with one or both of an angled grease port 36 oriented toward sealing face 26 and a valve body 12 with a sloped or funneled gate cavity opening 52.

In the illustrated example, each end 26 is configured to connect to a respective stem 32 using a pin 54 extending in the same direction as gate bore 28. Ends 26 include tongues 56. Stem 32 is positioned between tongues 56 and a pin 54 is positioned through tongues 56 and stem 32 and locked in place, for example via threads and or retainer rings and the like. Tongues 56 and/or pin 54 are recessed such that they do extend beyond the extended planes of sealing faces 22. In an embodiment, pin 54 and tongues 56 are recessed to have a width less than the width 58 of gate 18, e.g., less than the distance between the opposing sealing faces 22. In an embodiment, pin 54 has a length that is less than the width of gate 18. It will be recognized that gate 18 may be connected to the stem in other manners. The recessed end and pin may eliminate or mitigate the possibility of the pin protruding and damaging the seat 30 (e.g., FIGS. 1, 9, 10).

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A gate valve comprising:
    a valve body having a gate cavity formed by opposing walls extending to a first end of the valve body;
    a through bore intersecting the gate cavity and the opposing walls;
    seat pockets formed in the opposing walls around the through bore;
    the opposing walls extending parallel to each other from the seat pockets to a first kickoff point and the opposing walls diverge from each other and oblique to the center axis, from the kickoff point to the first end whereby the opposing walls form a sloped first gate cavity opening between the first kickoff point and the first end;
    a gate positioned in the gate cavity and moveable between a closed position blocking flow through the through bore and an open position allowing flow through the through bore, the gate having a sealing face extending perpendicular to the through bore;
    a three-dimensional frame of reference with three mutually orthogonal directions, wherein an X-axis corresponds to a center axis of the through bore, a Y-axis corresponds to a center axis of the gate cavity, a Z-axis is generally centered through a side of the gate wherein a Y-Z plane is parallel to the sealing face;
    a first bonnet coupled to the first end and forming a first terminal gate cavity end having a diameter substantially equivalent to a diameter of the sloped first gate cavity opening at the first end; and
    a lubrication port having an opening in the first terminal gate cavity end and a channel through the first bonnet, wherein the channel and the lubrication port opening are oblique to a Y-Z plane and oriented toward the sloped first cavity opening.

2. The gate valve of claim 1, wherein the sloped gate cavity opening is generally funnel shaped.

3. The gate valve of claim 1, wherein the gate comprises an end having a width along the X-axis that is less than a width of the gate at the sealing face.

4. The gate valve of claim 3, wherein the first gate cavity opening is generally funnel shaped along a portion adjacent the sealing face of the gate.

5. The gate valve of claim 3, wherein the end is connected to a stem by a pin extending generally perpendicular to the sealing face and the pin has a length that is less than the width of the gate at the sealing face.

6. The gate valve of claim 1, wherein the gate comprises opposing ends, wherein each end of the opposing ends has a width along the X-axis that is less than a width of the gate at the sealing face.

7. The gate valve of claim 1, wherein the channel and the opening are oblique to an X-Z plane.

8. The gate valve of claim 7, wherein the channel and the opening are parallel to an X-Y plane.

9. The gate valve of claim 7, wherein the channel and the opening are oblique to the X-Y plane.

10. The gate valve of claim 7, wherein:
    the channel and the opening are oblique to an X-Z plane; and
    the channel and the opening are parallel to an X-Y plane.

11. The gate valve of claim 7, wherein:
    the channel and the opening are oblique to an X-Z plane; and
    the channel and the opening are oblique to an X-Y plane.

* * * * *